(12) United States Patent
Odenheimer et al.

(10) Patent No.: US 10,187,393 B2
(45) Date of Patent: Jan. 22, 2019

(54) CLOSED-LOOP MULTI-SERVICE LOGGING

(71) Applicant: SAP SE, Walldorf (DE)

(72) Inventors: Jens Odenheimer, Karlsruhe (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 337 days.

(21) Appl. No.: 14/964,883

(22) Filed: Dec. 10, 2015

(65) Prior Publication Data

US 2017/0171233 A1    Jun. 15, 2017

(51) Int. Cl.
*H04L 29/06* (2006.01)

(52) U.S. Cl.
CPC .......... *H04L 63/102* (2013.01); *H05K 999/99* (2013.01)

(58) Field of Classification Search
CPC .................................. H04L 63/1425
USPC .............................................. 726/6
See application file for complete search history.

(56) References Cited

U.S. PATENT DOCUMENTS

| | | | | |
|---|---|---|---|---|
| 8,539,526 B1 * | 9/2013 | Hundemer | ............. | H04H 20/10 725/118 |
| 8,539,568 B1 * | 9/2013 | Milas | ................. | H04L 63/0815 726/8 |
| 9,043,886 B2 * | 5/2015 | Srinivasan | ............. | H04L 63/10 726/6 |
| 2010/0186066 A1 * | 7/2010 | Pollard | .................. | G06Q 20/40 726/3 |
| 2010/0281427 A1 * | 11/2010 | Ghosh | ................. | G06F 21/6263 715/811 |
| 2017/0149837 A1 * | 5/2017 | Sondhi | ..................... | H04L 63/20 |

FOREIGN PATENT DOCUMENTS

WO    WO/2017/023976    *   2/2017    ............. H04L 29/06

* cited by examiner

*Primary Examiner* — Khalil Naghdali
(74) *Attorney, Agent, or Firm* — Buckley, Maschoff & Talwalkar LLC (57) ABSTRACT

A system includes determination, at a first computing system, of the creation of a first user account, the first user account associated with a first username, a first identity store and a first person, determination, at the first computing system, of a first identifier uniquely identifying the first person, storage, at the first computing system, of a first association between the first username, the first identity store and the first identifier, reception, at a second computing system, of an indication of activity, the indication including the first username and the first identity store, determination, at the second computing system, the first identifier based on the first username, the first identity store and the stored first association, and creation, at the second computing system, of a log entry associating the activity with the first identifier.

18 Claims, 6 Drawing Sheets

| Access Mappings ,–272 ||||
|---|---|---|---|
| ID Store | Username | Personal Identifier | Time Range |
|  |  |  |  |
|  |  |  |  |
|  |  |  |  |
|  |  |  |  |

CLOSED-LOOP MULTI-SERVICE LOGGING

BACKGROUND

Enterprise computing systems employ mechanisms for logging various types of user activity. The resulting auditable logs are intended to provide technical information and/or to satisfy applicable legal requirements.

Typically, a client system maintains a log of its own users' activity, and this activity is also reflected in a log maintained by a server system with which the client system interacts. An identifier such as a username is used to associated client activity, which is logged on the client system, with corresponding server activity as logged by the server system. However, enterprise computing systems are increasingly distributed into substantially independent systems, each of which may be associated with its own user management/identity store. Such a configuration is not amenable to traditional approaches for logging user activity.

Figure 1:
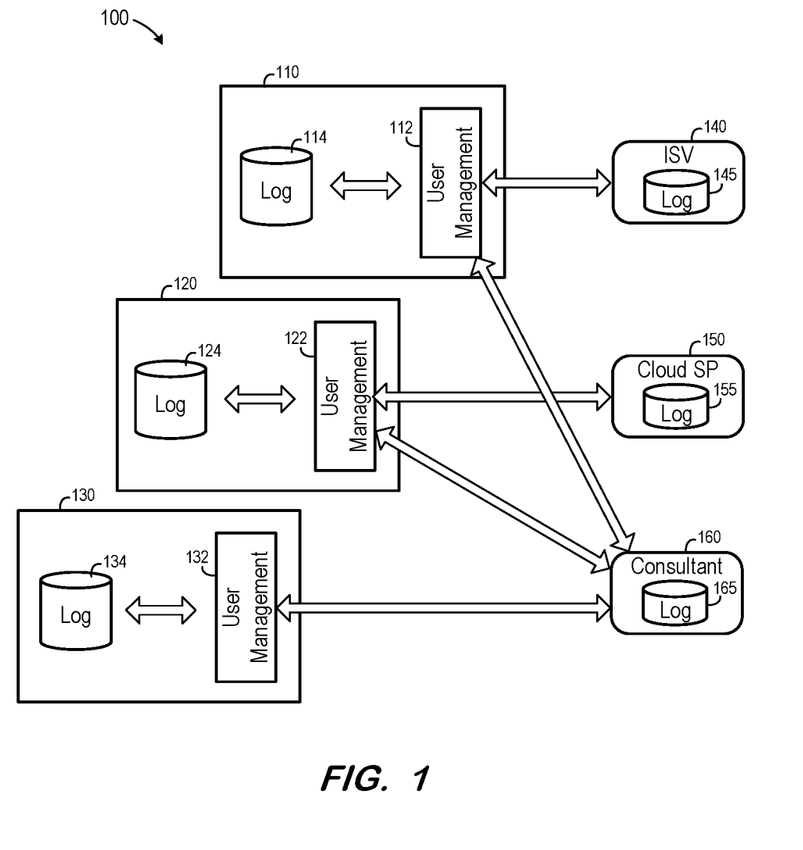
FIG. 1 is a block diagram of a system.

FIG. 1 illustrates cloud deployment 100 including a three-layered stack. Software-as-a-Service (SaaS) layer 110, Platform-as-a-Service (PaaS) layer 120, and Infrastructure-as-a-Service (IaaS) layer 130 include respective logs 114, 124 and 134 for logging user activities associated with each layer. However, since each layer 110, 120 and 130 is governed by a different respective user management service 112, 122 and 132, the user basis for each layer's logging differs.

The layers of cloud deployment 100 include many different entities. For example, Independent Software Vendor (ISV) 140 may only require access to SaaS layer 110, whereas Cloud Service Provider 150 may require access to PaaS layer 120 and IT Consultant 160 may require access to all layers. This architecture results in a web of access patterns and log locations which is not easily auditable.

For example, ISV 140 may log locally that the employee Mr. Smith is logged on to the ISV's systems and has accessed a customer cloud system. However, per an established custom, Mr. Smith is not associated with a personalized user in the customer cloud system, but is assigned a temporary (and anonymous) technical support user by the customer cloud system. The respective layer (i.e., SaaS layer 110) then logs the access and activities of this technical support user. The link between log 114 of SaaS layer 110 and Mr. Smith is severed from an auditability point of view and may only be reconstructed via the cumbersome process of analyzing the ISV's logs and logs 114, 124 and 134 to determine the association between Mr. Smith and the technical support user.

DETAILED DESCRIPTION

Figure 2:
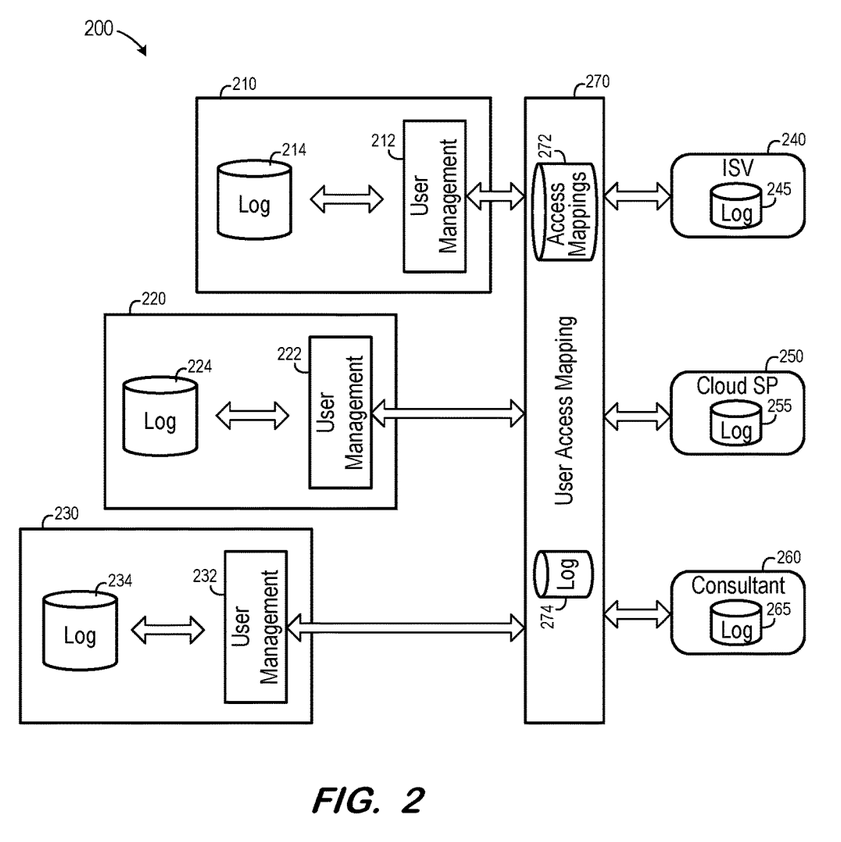
FIG. 2 is a block diagram of a system according to some embodiments.

FIG. 2 is a block diagram of system 200 according to some embodiments. FIG. 2 represents a logical architecture for describing processes according to some embodiments, and actual implementations may include more or different logical elements arranged in other manners. Each logical element may be implemented by computing hardware and/or by program code executed by one or more processors of one or more computing devices.

Architecture 200 of FIG. 2 comprises a three-layered stack but embodiments are not limited thereto. Some embodiments may be employed in any architecture which includes more than one user management service/identity store and/or which provides for temporary or anonymous users.

Architecture 200 includes layer 210 (e.g., a SaaS layer), layer 220 (e.g., a PaaS layer), and layer 230 (e.g., an IaaS layer). Layers 210, 220 and 230 include respective logs 214, 224 and 234 for logging activities occurring within each layer. Each layer also includes a respective user management service 212, 222 or 232. User management services 212, 222 and 232 control user access to their respective layers. As such, user management services 212, 222 and 232 may store login information (e.g., username, password, role(s)) for authorized users, and may evaluate login requests received from client 240, 250 and 260 against the stored login information. As an alternative to storing and managing login information, one or more of user management services 212, 222 and 232 may operate in conjunction with one or more identity stores storing such login information.

User management services 212, 222 and 232 may operate to add, delete and otherwise manage user accounts of their respective layers. User management services 212, 222 and 232 may also operate to create temporary user accounts. In some embodiments, a temporary user account is not fixedly associated with a real person but may be associated with different people at different times. Some systems refer to such a temporary user account as a technical user, which may be temporarily (i.e., for a fixed and limited time) associated with a particular person.

According to some embodiments, user access mapping 270 comprises a service to maintain associations between user accounts of layers 210, 220 and 230 and identifiers of real persons. These associations may be stored in access mappings 272. User access mapping 270 may provide the identifiers to clients 240, 250 and 260 such that the identifiers may be included within entries of respective logs 245, 255 and 265. Log 274 may store entries which log various activities of user access mappings 270 itself (e.g., receiving an instruction to create a new association, receiving a request for a personal identifier associated with a user account, etc.).

Each service and/or layer described herein may be implemented using any combination of hardware and executable program code conforming to any executable instruction language. One or more of the services and/or layers may share hardware components and/or program code. According to some embodiments, the services and/or layers may be distributed, on-premise or at remote locations, and may communicate with one another via Internet network protocols.

Figure 3:
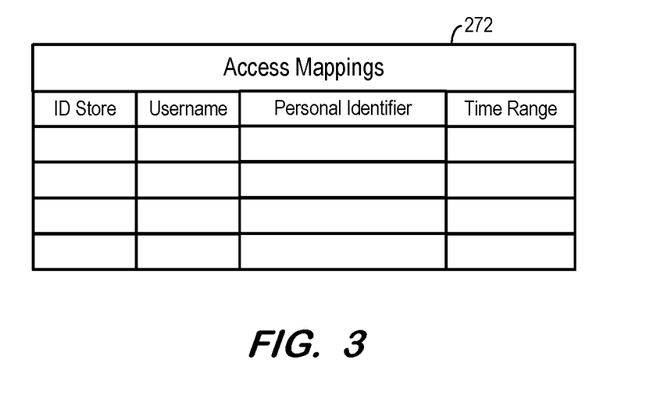
FIG. 3 is a tabular representation of a portion of a database table according to some embodiments.

FIG. 3 is a tabular representation of an example of access mappings 272 according to some embodiments. Each record of access mappings 272 includes associations between user accounts of layers 210, 220 and 230 and identifiers of real persons. As described herein, such information may be utilized in some embodiments to result in easily-auditable log entries within logs 245, 255 and 265.

In the FIG. 3 example, access mappings 272 associate an identity store and a username with a personal identifier and, if applicable, a time range. Within each record of access mappings 272, the username identifies a particular user account and the identity store (which may be identified in the record by a URL, an ID, or any other identifier) is an entity which manages the user account. As mentioned above, the identity store may comprise a user management service and/or a dedicated identity store. One identity store may provide identity information for more than one user management service, and one user management service may manage user accounts in conjunction with more than one identity store.

The personal identifier of a record identifies a particular person associated with the associated username of the record. The personal identifier may comprise any data which may be used (e.g., by one of user systems 240, 250, and 260 and/or by an auditing system) to identify a particular person. According to some embodiments, the personal identifier specifies a name and a user identity store (e.g., "Mr. Smith@Cloud SP").

Each record of access mappings 272 may also be associated with a time range over which the record's associations are/were valid. Each username, for example, may expire according to a predefined schedule, in which case the time range of a username reflects the predefined schedule. The time range field of a record may include a value indicating that the username of the record does not expire.

One record of access mappings 272 may specify a particular username and identity store, along with a first personal identifier (e.g., "Mr. Smith@Cloud SP") and a first time range (e.g., 12/9/15_13:45:01.44-12/12/15_01:45: 01.44), while a second record may specify the same particular username and identity store, along with a second personal identifier (e.g., "Mr. Jones@ISV") and a second time range (e.g., 12/23/15_12:05:32.32-12/26/15_00:05: 32.32). According to some embodiments, the particular username identifies a technical user account of the particular identity store.

Figure 4:
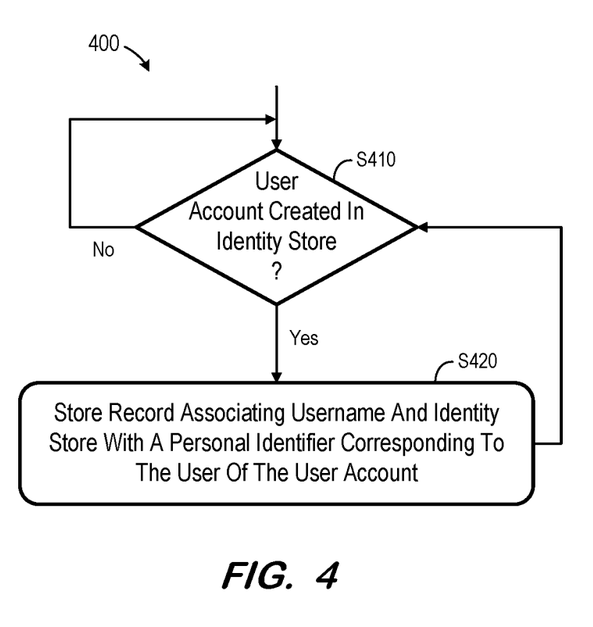
FIG. 4 is a flow diagram of a process according to some embodiments.

FIG. 4 is a flow diagram of process 400 to populate access mappings 272 according to some embodiments. In some embodiments, various hardware elements of architecture 200 execute program code to perform process 400. In some embodiments, hard-wired circuitry may be used in place of, or in combination with, program code for implementation of processes according to some embodiments. Embodiments are therefore not limited to any specific combination of hardware and software.

Initially, flow cycles at S410 until it is determined that a user account has been created in an identity store. In some embodiments, user access mapping 270 communicates with various identity stores (e.g., user management services 212, 222 and 232) to monitor creation of user accounts. In some embodiments, the various identity stores transmit indications to user access mapping 270 after creating a user account. For example, a user account may be created at S410 in user management service 222 of PaaS layer 220, in response to which user management service 222 transmits an indication (e.g., details of the user account) to user access mapping 270. Creation of the account may be logged in log 224.

As described above, an identity store may comprise any layer, entity or service which manages and/or stores user account information. As is known in the art, an administrator of an identity store may create a user account at S410 by defining a username, password, permissions, roles, etc. The user account is typically also associated with a particular person (i.e., a user). The user account may be a short-term account, such as a technical user account.

Next, at S420, a record is stored which associates the username and identity of the user account with a personal identifier corresponding to the particular person with whom the user account is associated. According to the FIG. 2 embodiment, the identity store transmits the username and the identity of the particular person to user access mapping 270 at S420. User access mapping 270 may then store a record at S420 such as a record of access mappings 272 of FIG. 3. As described above, such a record associates the identity store (i.e., from which the information was received) with the username of the user account, the particular person associated with the account and, if applicable, a time range over which the association represented by the record is valid. Storage of the record may also be logged in log 274. Flow returns to S410 to await creation of another user account and continues as described above.

Figure 5:
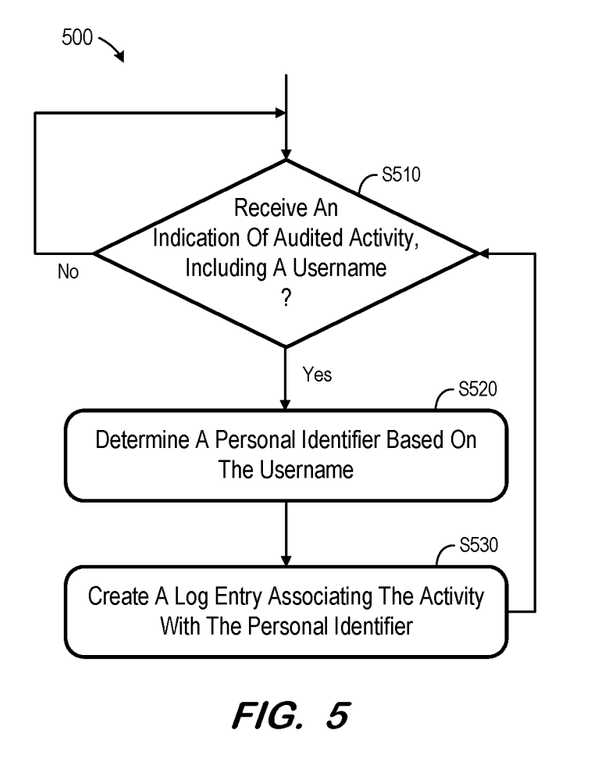
FIG. 5 is a flow diagram of a process according to some embodiments.

FIG. 5 is a flow diagram of process 500 according to some embodiments. Process 500 may be executed to facilitate the creation of user system log entries (e.g., entries of logs 245, 255 and 265) according to some embodiments.

Prior to process 500, it will be assumed that a user of systems 240, 250 or 260 has accessed one of layers 210, 220 or 230. This access is not necessarily routed through or otherwise controlled by user access mapping 270 as suggested by FIG. 2, but is typically via an autonomous link between the user system and the layer. For example, ISV 240 may access a Web portal of layer 210 via the World Wide Web using a Web browser and a corresponding URL.

During the above-described access, an indication of audited activity is received from the accessed system at S510. The indication may describe activity of a type that is to be logged, such as, but not limited to, any activity that may be subjected to an audit. The indication includes a username associated with the activity (e.g., the username of the user account of layer 210 under which the activity occurred). Again, this indication may be received over a direct connection between the layer and the user system, and need not be routed through user access mapping 270.

Continuing the above example, ISV 240 may receive the indication of audited activity from layer 210 at S510. The indication may include a username associated with a user account managed by user management service 212.

After receiving an indication at S510, a personal identifier is determined at S520 based on the username. According to some embodiments, ISV 240 queries user access mapping 270 at S520 for a personal identifier associated with the username. The query may specify the username, the identity store associated with the username (e.g., the system from which the indication of activity was received or a known identity store associated with that system), and a time stamp associated with the activity (i.e., indicating a time at which the activity occurred). These data elements may be used to locate a corresponding personal identifier among records of access mappings 272, which may have been generated according to above-described process 400.

A log entry is created at the user system at S530. The log entry associated the activity with the personal identifier and with any other suitable information describing the activity. For example, ISV 240 may create a log entry within log 245 which includes the personal identifier of a user, rather than only a username associated with that user within system 210. Flow returns to S510 from S530 to wait for a next indication.

Process 500 therefore facilitates the creation of log entries which indicate activities of local users on access layers. In a specific example, it is assumed that an administrator of PaaS layer 220 is also a manager of an administration team. This person may therefore be associated with an admin user account to access PaaS layer 220 and a different user account to access a Human Resources application running on SaaS layer 210. It is further assumed that this person modified authorization rights in SaaS user management 222 that runs on PaaS layer 220 and, afterwards, used the modified authorization rights to access data in the Human Resources application that she should not have accessed. This unauthorized access can be revealed by evaluating logs created according to the above embodiments, which associate a same personal identifier with each of the above activities.

Figure 6:
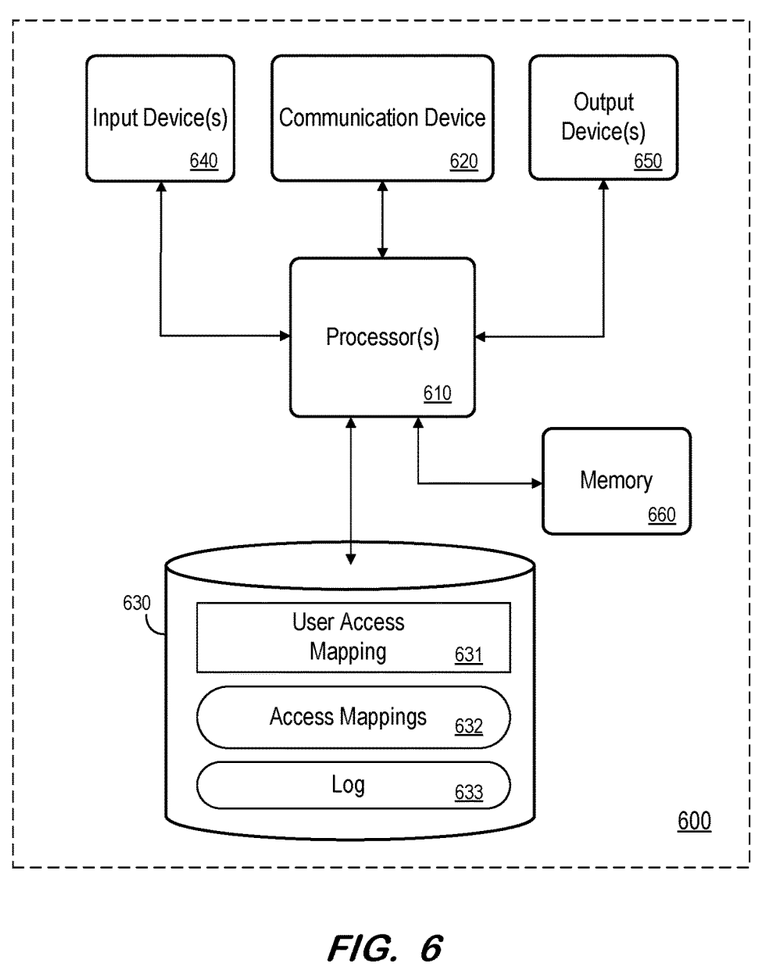
FIG. 6 is a block diagram of a computing device according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of user access mapping 270 according to some embodiments. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as client 210 or resources 230-234. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device 630 may comprise any device, including combinations of magnetic storage devices (e.g., magnetic tape, hard disk drives and flash memory), optical storage devices, Read Only Memory (ROM) devices, etc., while memory 660 may comprise Random Access Memory (RAM).

User access mapping 631 of data storage device 630 may comprise program code executable by processor 610 to provide any of the functions described herein with respect to user access mapping 270. Access mappings may associate usernames and identity stores with personal identifiers as described with respect to access mappings 272 of FIGS. 2 and 3. Data storage device 630 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of architecture 200 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations.

What is claimed is:

1. A computing system comprising:
a first memory storing first processor-executable program code;
a first processor to execute the first processor-executable program code in order to cause the computing system to:
determine creation of a first user account authorized to access a first computing system, the first user account associated with a first username, a first identity store and a first person, wherein the first identity store is an entity that manages the first user account at the first computing system;
determine a first identifier uniquely identifying the first person, wherein the first identifier specifies a name and the first identity store; and
store a first association between the first username, the first identity store and the first identifier at a user access mapping;
a second memory storing second processor-executable program code; and
a second processor to execute the second processor-executable program code in order to cause the computing system to:
receive at a client system, from the first computing system, an indication of activity at the first computing system, the indication including the first username and the first identity store;
query the user access mapping to determine the first identifier based on the first username, the first identity store associated with the first username and the stored first association, wherein the first username, the first identity store and the first association are used to locate a corresponding first identifier stored by the user access mapping; and
create a log entry at the client system associating the activity with the first identifier, to identify the first person performing the activity at the first computing system, wherein the client system is distinct from the first computing system.

2. The computing system according to claim 1, the first processor to execute the first processor-executable program code in order to cause the computing system to:
determine the creation of a second user account, the second user account associated with a second username, the first identity store and a second person;
determine a second identifier uniquely identifying the second person; and store a second association between the second username, the first identity store and the second identifier.

3. The computing system according to claim 2, the first processor to execute the first processor-executable program code in order to cause the computing system to:
determine the creation of a third user account, the third user account associated with a third username, a second identity store and the first person; and
store a third association between the third username, the second identity store and the first identifier.

4. The computing system according to claim 1, the first processor to execute the first processor-executable program code in order to cause the computing system to:
   determine the creation of a second user account, the second user account associated with a second username, a second identity store and the first person; and
   store a second association between the second username, the second identity store and the first identifier.

5. The computing system according to claim 1, wherein the first user account is associated with a first time range, and
   wherein storage of the first association comprises storage of a first association between the first username, the first identity store, the first identifier, and the first time range.

6. The computing system according to claim 1, a first processor to execute the first processor-executable program code in order to cause the computing system to:
   determine the creation of a second user account, the second user account associated with the first username, the first identity store, a second time range and a second person;
   determine a second identifier uniquely identifying the second person; and
   store a second association between the first username, the first identity store, the second time range and the second identifier.

7. A method executed by a computing system, the method comprising:
   determining, at a first computing system, the creation of a first user account, the first user account associated with a first username, a first identity store and a first person wherein the first identity store is an entity that manages the first user account at the first computing system;
   determining, at the first computing system, a first identifier uniquely identifying the first person, wherein the first identifier specifies a name and the first identity store;
   storing, at a user access mapping, a first association between the first username, the first identity store and the first identifier;
   receiving, at a second computing system from the user access mapping, an indication of activity at the first computing system, the indication including the first username and the first identity store;
   querying the user access mapping to determine the first identifier based on the first username, the first identity store associated with the first user name and the stored first association, wherein the first username, the first identity store and the first association are used to locate a corresponding first identifier stored by the user access mapping; and
   creating, at the second computing system, a log entry associating the activity with the first identifier, to identify the first person performing the activity at the first computing system, wherein the second computing system is distinct from the first computing system.

8. The method according to claim 7, further comprising:
   determining, at the first computing system, the creation of a second user account, the second user account associated with a second username, the first identity store and a second person;
   determining, at the first computing system, a second identifier uniquely identifying the second person; and
   storing, at the user access mapping, a second association between the second username, the first identity store and the second identifier.

9. The method according to claim 8, further comprising:
   determining, at the first computing system, the creation of a third user account, the third user account associated with a third username, a second identity store and the first person; and
   storing, at the user access mapping, a third association between the third username, the second identity store and the first identifier.

10. The method according to claim 7, further comprising:
    determining, at the first computing system, the creation of a second user account, the second user account associated with a second username, a second identity store and the first person; and
    storing, at the user access mapping, a second association between the second username, the second identity store and the first identifier.

11. The method according to claim 7, wherein the first user account is associated with a first time range, and
    wherein storage of the first association comprises storage of a first association between the first username, the first identity store, the first identifier, and the first time range.

12. The method according to claim 7, further comprising:
    determining, at the first computing system, the creation of a second user account, the second user account associated with the first username, the first identity store, a second time range and a second person;
    determining, at the first computing system, a second identifier uniquely identifying the second person; and
    storing, at the user access mapping, a second association between the first username, the first identity store, the second time range and the second identifier.

13. A non-transitory computer-readable medium storing program code, the program code executable by a processor of a computing system to cause the computing system to:
    determine, at a first computing system, creation of a first user account, the first user account associated with a first username, a first identity store and a first person, wherein the first identity store is an entity that manages the first user account at the first computing system;
    determine, at the first computing system, a first identifier uniquely identifying the first person, wherein the first identifier specifies a name and the first identity store;
    store, at a user access mapping, a first association between the first username, the first identity store and the first identifier;
    receive, at a second computing system from the first computing system, an indication of activity at the first computing system, the indication including the first username and the first identity store;
    query the user access mapping to determine the first identifier based on the first username, the first identity store associated with the first username and the stored first association, wherein the first username, the first identity store and the first association are used to locate a corresponding first identifier stored by the user access mapping; and
    create, at the second computing system, a log entry associating the activity with the first identifier, to identify the first person performing the activity at the first computing system, wherein the second computing system is distinct from the first computing system.

14. The non-transitory computer-readable medium according to claim 13, the program code executable by a processor of a computing system to cause the computing system to:

determine, at the first computing system, the creation of a second user account, the second user account associated with a second username, the first identity store and a second person;

determine, at the first computing system, a second identifier uniquely identifying the second person; and store, at the user access mapping, a second association between the second username, the first identity store and the second identifier.

15. The non-transitory computer-readable medium according to claim 14, the program code executable by a processor of a computing system to cause the computing system to:

determine, at the first computing system, the creation of a third user account, the third user account associated with a third username, a second identity store and the first person; and store, at the user access mapping, a third association between the third username, the second identity store and the first identifier.

16. The non-transitory computer-readable medium according to claim 13, the program code executable by a processor of a computing system to cause the computing system to:

determine, at the first computing system, the creation of a second user account, the second user account associated with a second username, a second identity store and the first person; and store, at the user access mapping, a second association between the second username, the second identity store and the first identifier.

17. The non-transitory computer-readable medium according to claim 13, wherein the first user account is associated with a first time range, and wherein storage of the first association comprises storage of a first association between the first username, the first identity store, the first identifier, and the first time range.

18. The non-transitory computer-readable medium according to claim 13, the program code executable by a processor of a computing system to cause the computing system to:

determine, at the first computing system, the creation of a second user account, the second user account associated with the first username, the first identity store, a second time range and a second person;

determine, at the first computing system, a second identifier uniquely identifying the second person; and store, at the user access mapping, a second association between the first username, the first identity store, the second time range and the second identifier.

* * * * *